W. R. KING.
Improvement in Baling Presses.
No. 125,741.  Patented April 16, 1872.
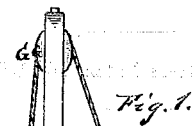
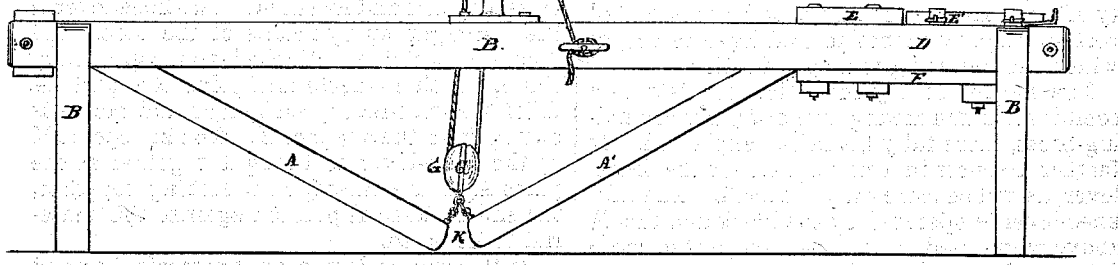
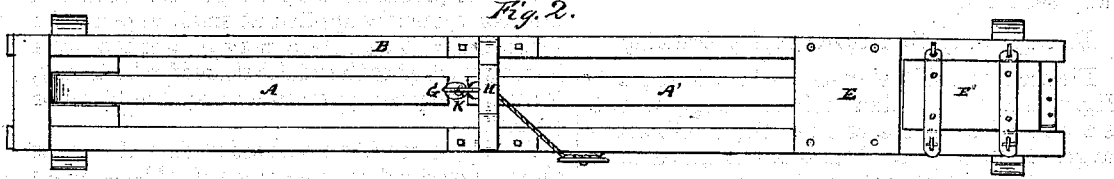
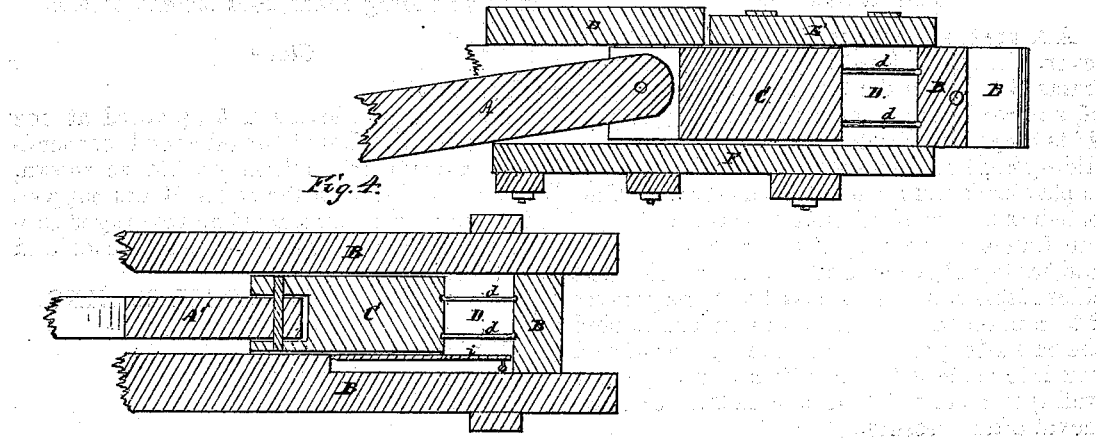
Witnesses.  Wendell R. King, Inventor.

UNITED STATES PATENT OFFICE.

WENDELL R. KING, OF CHICAGO, ILLINOIS.

IMPROVEMENT IN BALING-PRESSES.

Specification forming part of Letters Patent No. 125,741, dated April 16, 1872.

SPECIFICATION.

I, WENDELL R. KING, of Chicago, in the county of Cook and State of Illinois, have invented certain Improvements in Baling-Presses, of which the following is a specification:

The nature of my invention consists in a combination and arrangement of parts in a baling-press, more fully hereafter explained. It further consists in a novel joint for the knee-lever, as will be more fully set forth. The said knee-lever is operated by the block and tackle above mentioned, as will be hereinafter more fully set forth.

Description of the Accompanying Drawing.

Figure 1 is a side elevation of my invention. Fig. 2 is a top or plan view of same. Fig. 3 is a vertical central section of the bale-box enlarged from Fig. 1. Fig. 4 is a transverse or horizontal central section of same.

General Description.

A A' are the two parts of the horizontal knee-lever. The part A is hinged or pivoted to the frame B between the two main timbers thereof, and works freely up and down. The part A' is hinged or pivoted in like manner to the sliding head or presser C, which is constructed to play back and forth in the bale-box D. This bale-box is formed of the two main timbers of the frame, covered by the part E and lid E', and having a bottom formed of the part F. The sides of this box D are grooved with the grooves d to contain the cord or other material to bind the bale after pressure; and the interior of said box D is made with the ordinary movable side wall i, to relax the bale and facilitate its removal after pressure.

The hay, hair, or other material to be baled is placed in the box D and the lid or cover E' closed upon it and fastened. The knee-lever is then brought up by means of the block and tackle G, which is attached to a connecting-chain, which connects and joins the parts A A' of the knee-lever; said block and tackle is swung from the support H. The knee-joint K of the knee-lever is brought together as the parts A A' are raised, and, bearing together, the sliding head is pressed against the material to be baled.

By this simple device great power is obtained and conveniently applied at small expense for machinery. The tackle may be worked by a horse attached to the "fall" thereof, which may, for that purpose, pass under a snatch-block or pulley.

It will be readily understood that the press above described may be made double—that is to say, the box may be placed at both ends, and two sliding heads used instead of one.

Claim.

I claim—

The horizontal levers A A', pivoted at one end, as described, with the other ends suspended by a chain and hoisting-tackle, as shown, in combination with the frame B and support H, when all are constructed and arranged substantially as and for the purposes shown and set forth.

WENDELL R. KING.

Witnesses:
CICERO NEWELL,
J. W. MUNDAY.